(12) United States Patent
Shinomoto et al.

(10) Patent No.: US 10,177,703 B2
(45) Date of Patent: Jan. 8, 2019

(54) POWER CONVERSION DEVICE AND COMPRESSOR DRIVING DEVICE

(71) Applicant: Mitsubishi Electric Corporation, Tokyo (JP)

(72) Inventors: Yosuke Shinomoto, Tokyo (JP); Koichi Arisawa, Tokyo (JP); Takashi Yamakawa, Tokyo (JP); Yuji Takayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/509,985

(22) PCT Filed: Sep. 17, 2014

(86) PCT No.: PCT/JP2014/074592
§ 371 (c)(1),
(2) Date: Mar. 9, 2017

(87) PCT Pub. No.: WO2016/042628
PCT Pub. Date: Mar. 24, 2016

(65) Prior Publication Data
US 2017/0302217 A1    Oct. 19, 2017

(51) Int. Cl.
*H02P 29/50* (2016.01)
*H02P 6/28* (2016.01)
(Continued)

(52) U.S. Cl.
CPC .............. *H02P 29/50* (2016.02); *F04B 39/00* (2013.01); *F04C 29/00* (2013.01); *H02P 6/28* (2016.02); *H02P 27/06* (2013.01)

(58) Field of Classification Search
CPC .................................. H02P 29/50; H02P 6/28
(Continued)

(56) References Cited

U.S. PATENT DOCUMENTS

| 5,668,713 A | 9/1997 | Eguchi et al. |
| 5,748,459 A * | 5/1998 | Yamada .................. H02M 7/00 318/490 |

(Continued)

FOREIGN PATENT DOCUMENTS

| AU | 2012367570 B2 | 8/2013 |
| JP | 02-046174 A | 2/1990 |

(Continued)

OTHER PUBLICATIONS

International Search Report of the International Searching Authority dated Dec. 16, 2014 for the corresponding International application No. PCT/JP2014/074592 (and English translation).

(Continued)

*Primary Examiner* — Kawing Chan
*Assistant Examiner* — Bradley Brown
(74) *Attorney, Agent, or Firm* — Posz Law Group, PLC (57) ABSTRACT

A leak-current detecting unit detects a zero-phase current flowing from an electric-motor driving device, which drives an electric motor with electric power from an alternating-current power supply, or the electric motor to a ground, a leak-current control unit that, on the basis of the zero-phase current detected by the leak-current detecting unit, generates a control signal having cyclicity synchronized with the alternating-current power supply, and an anti-phase generating unit that generates an anti-phase current that is in anti-phase to the zero-phase current on the basis of the control signal from the leak-current control unit, and outputs the anti-phase current.

15 Claims, 10 Drawing Sheets

(51) Int. Cl.
*F04B 39/00* (2006.01)
*F04C 29/00* (2006.01)
*H02P 27/06* (2006.01)

(58) Field of Classification Search
USPC .................................................. 318/400.25
See application file for complete search history.

(56) References Cited

U.S. PATENT DOCUMENTS

| | | | | |
|---|---|---|---|---|
| 6,134,126 | A | * | 10/2000 | Ikekame .................. H02J 3/01 |
| | | | | 307/105 |
| 9,190,926 | B2 | | 11/2015 | Taguchi |
| 2008/0130335 | A1 | * | 6/2008 | Yuzurihara .......... H02M 7/125 |
| | | | | 363/125 |
| 2013/0170077 | A1 | | 7/2013 | Dillig et al. |
| 2013/0234778 | A1 | * | 9/2013 | Kuwabara ............... H02M 1/08 |
| | | | | 327/419 |
| 2015/0009723 | A1 | | 1/2015 | Taguchi |
| 2015/0009725 | A1 | | 1/2015 | Taguchi |

FOREIGN PATENT DOCUMENTS

| | | | |
|---|---|---|---|
| JP | 07-322686 | A | 12/1995 |
| JP | 09-117151 | A | 5/1997 |
| JP | 09-233837 | A | 9/1997 |
| JP | 10-154921 | A | 6/1998 |
| JP | 2000-092861 | A | 3/2000 |
| JP | 2000-152692 | A | 5/2000 |
| JP | 2000-184737 | A | 6/2000 |
| JP | 2000-224869 | A | 8/2000 |
| JP | 2002-064949 | A | 2/2002 |
| JP | 2002064949 | A * | 2/2002 |
| JP | 2004-364344 | A | 12/2004 |
| JP | 2008-234298 | A | 10/2008 |
| JP | 2013-055797 | A | 3/2013 |
| JP | 2013-158096 | A | 8/2013 |
| JP | 2013-158099 | A | 8/2013 |
| JP | 2013-187955 | A | 9/2013 |
| KR | 10-2014-0110009 | A | 9/2014 |

OTHER PUBLICATIONS

Office Action dated Feb. 6, 2018 issued in corresponding KR patent application No. 10-2017-7009769 (and English translation).
Extended EP Search Report dated May 9, 2018 issued in corresponding EP patent application No. 14902277.4.
"Bearing Failure Diagnosis in three-phase Induction Motor by Chirp-Z Transform and Zoom-MUSIC" authored by Xiangjun Wang and Fang Fang, pp. 1016 to 1019, IEEE (2011).
Office action dated Oct. 31, 2018 issued in corresponding CN patent application No. 201480081986.8 (and English machine translation thereof).
Office action dated Aug. 27, 2018 issued in corresponding KR patent application No. 10-2017-7009769 (and English machine translation thereof).

* cited by examiner

POWER CONVERSION DEVICE AND COMPRESSOR DRIVING DEVICE

CROSS REFERENCE TO RELATED APPLICATION

This application is a U.S. national stage application of PCT/JP2014/074592 filed on Sep. 17, 2014, the contents of which are incorporated herein by reference.

FIELD

The present invention relates to a power conversion device and a compressor driving device that reduce a leak current to a ground.

BACKGROUND

Conventionally, control that reduces a current leaking to a ground is executed in an electric-motor driving device that drives an electric motor. For example, Patent Literature 1 listed below discloses a technique that, in an anti-phase voltage generating unit, stores in advance correction table data obtained by adjusting a phase and an amplitude of an anti-phase voltage so as to minimize a leak current, together with sine-wave table data in a memory, and injects a current canceling out the leak current to a power-supply ground point.

Also, Patent Literature 2 listed below discloses a technique in which a table for selecting a duty of PWM (Pulse Width Modulation) control of a leak-reduction driving unit is provided in a leak-current canceller circuit.

Further, Patent Literature 3 listed below discloses a technique that, in an inverter device, obtains an accurate current flowing in an alternating-current electric motor by detecting a leak current flowing to the earth via a floating capacitance in advance, storing the detected leak current in a storing circuit, and subtracting the leak current in the storing circuit from a detected current flowing in the alternating-current electric motor.

In addition, Patent Literature 4 listed below discloses a technique that, in a compressor driving device of an air conditioner, a leak current that is a zero-phase current is detected by a common mode coil, and an anti-phase current is injected to a housing ground point in such a manner that the detected current is canceled out, so that compensation to make the leak current zero is achieved.

CITATION LIST

Patent Literatures

Patent Literature 1: Japanese Patent Application Laid-open No. H10-154921
Patent Literature 2: Japanese Patent Application Laid-open No. 2004-364344
Patent Literature 3: Japanese Patent Application Laid-open No. H7-322686
Patent Literature 4: Japanese Patent Application Laid-open No. 2000-152692

SUMMARY

Technical Problem

However, according to the techniques of Patent Literature 1 and 2, the anti-phase current is injected by using a driving signal of an inverter that drives the electric motor so as to reduce the leak current in advance, so that the leak current is reduced. Therefore, when a situation is ideal, the leak current is reduced. However, there is a problem that a phase of the anti-phase current and a phase of the leak current may be matched depending on some variations of components constituting a product, causing inverse compensation that increases the leak current.

Further, according to the technique of Patent Literature 3, the inverter device stores the leak current therein and subtracts the leak current from an electric-motor current when driving the electric motor. However, the leak current is not reduced.

Furthermore, according to the technique of Patent Literature 4, the compressor driving device performs a compensation operation that cancels the leak current detected by the common mode coil. However, because the compressor driving device performs the compensation operation after detecting the leak current, a delay occurs and therefore compensation synchronized with the detected leak current cannot be performed. Further, there is a problem of a small amount of compensation.

The present invention has been achieved in view of the above problems, and an object of the present invention is to obtain a power conversion device and a compressor driving device that can eliminate a delay of an operation for compensating a leak current and can reduce the leak current without causing any inverse compensation.

Solution to Problem

In order to solve the problems and achieve the object, there is provided a power conversion device including: a leak-current detecting unit that detects a zero-phase current flowing from an electric-motor driving device, which drives an electric motor with electric power from an alternating-current power supply, or the electric motor to a ground; a leak-current control unit that generates, on the basis of the zero-phase current detected by the leak-current detecting unit, a control signal having cyclicity that is synchronized with the alternating-current power supply; and an anti-phase current generating unit that generates, on the basis of the control signal from the leak-current control unit, an anti-phase current that is in anti-phase with respect to the zero-phase current, and outputs the anti-phase current.

Advantageous Effects of Invention

According to the power conversion device and the compressor driving device of the present invention, an effect is obtained where it is possible to eliminate a delay of an operation for compensating a leak current and reduce the leak current without causing any inverse compensation.

DESCRIPTION OF EMBODIMENTS

Exemplary embodiments of a power conversion device and a compressor driving device according to the present invention will be described below in detail with reference to the accompanying drawings. The present invention is not limited to the embodiments.

First Embodiment

Figure 1:
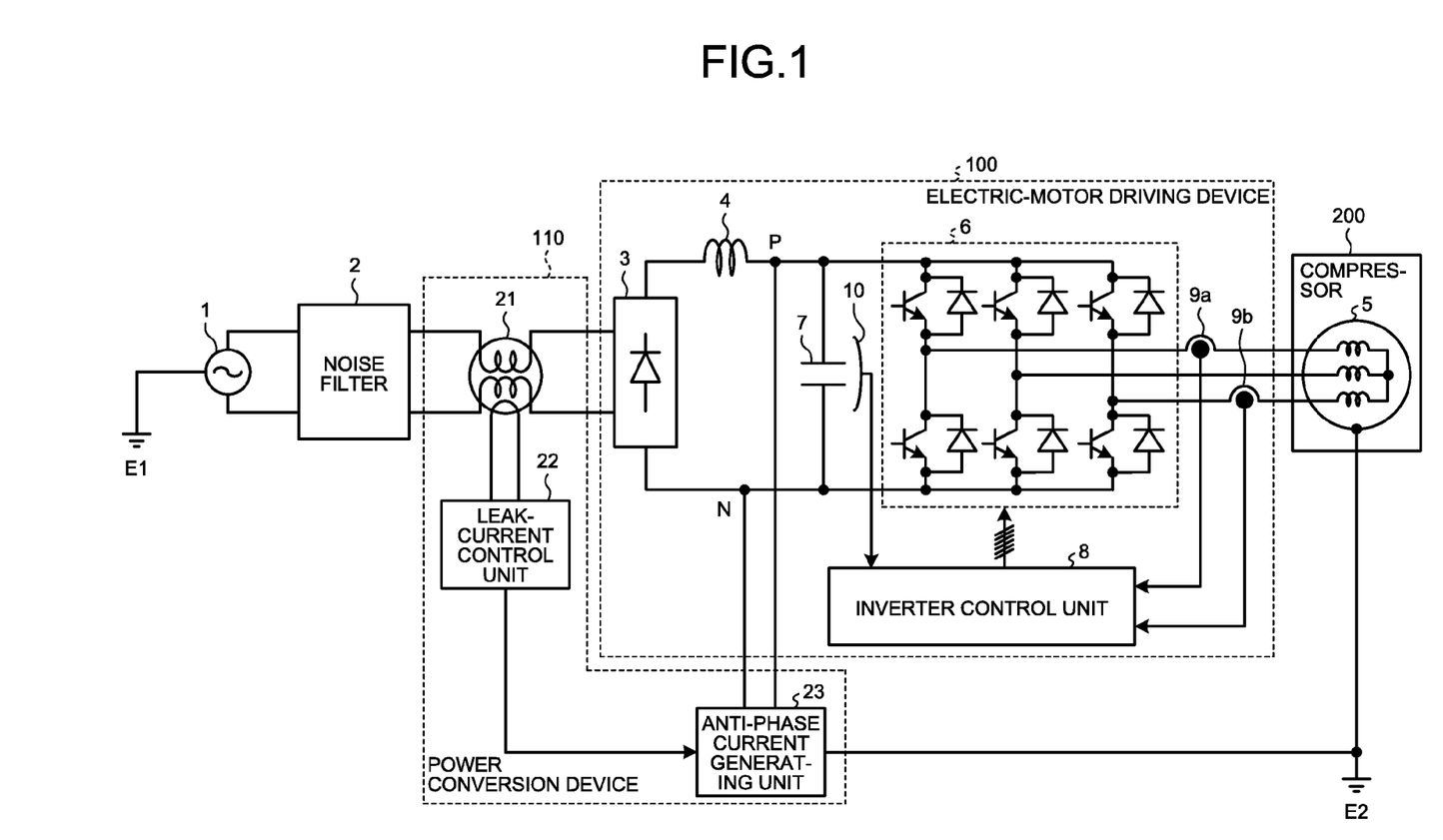
FIG. 1 is a circuit block diagram illustrating a configuration example of a power conversion device and an electric-motor driving device according to a first embodiment.

FIG. 1 is a circuit block diagram illustrating a configuration example of a power conversion device and an electric-motor driving device according to a first embodiment. A power conversion device 110 is coupled to an electric-motor driving device 100. The electric-motor driving device 100 includes: a rectifier 3 that rectifies an alternating-current power output from an alternating-current power supply 1, subjected to a filtering process by a noise filter 2, and input via the power conversion device 110; a reactor 4; an inverter main circuit 6 driving an electric motor 5; a smoothing capacitor 7; an inverter control unit 8 controlling the inverter main circuit 6; current detectors 9a and 9b detecting a current of the electric motor 5; and a voltage detector 10 detecting a voltage of the smoothing capacitor 7. In the electric-motor driving device 100, the rectifier 3, the reactor 4, and the smoothing capacitor 7 constitute an AC to DC converting unit. The power conversion device 110 executes control that reduces a leak current leaking from the electric motor 5 to a ground E2.

The electric motor 5 has a form in which it is included in a compressor 200, as illustrated in FIG. 1, for example. However, the use of the electric motor 5 is not limited thereto. In a case where the electric motor 5 is included in the compressor 200, a compressor driving device that uses the electric-motor driving device 100 coupled to the power conversion device 110 is configured to drive the compressor 200. This is the same for the following embodiments.

First, a path through which the leak current flows is described in FIG. 1. In order to drive the electric motor 5, the inverter control unit 8 controls the inverter main circuit 6 to output a voltage from the inverter main circuit 6 to the electric motor 5, on the basis of electric-motor currents detected by the current detectors 9a and 9b and a direct-current voltage detected by the voltage detector 10. The voltage output from the inverter main circuit 6 is usually subjected to PWM control, and therefore has a pitch controlled by a carrier frequency. Because the carrier frequency is higher than a rotation frequency of the electric motor 5, the leak current flows to the ground E2, which is an earth point, via a floating capacitance between a winding inside the electric motor 5 and a case, although not illustrated in FIG. 1. That is, a current flows from the case of the electric motor 5 to the ground E2. Because a ground E1 that is an earth point coupled to the alternating-current power supply 1 is electrically connected to the ground E2 although not coupled to the ground E2 in FIG. 1, the current flows from the ground E2 to the ground E1.

The current leaking from the floating capacitance of the electric motor 5 is the leak current. However, a floating capacitance with respect to the ground E2 is present not only in the electric motor 5 but also in other many portions, for example, in the electric-motor driving device 100. Further, in a case of the electric motor 5 included in the compressor 200 used for an air conditioner, in particular, the floating capacitance with respect to the ground in the electric motor 5 is large, and the leak current is a problem. While a refrigerant flows inside the compressor 200, the refrigerant is an electrically-conductive material having a dielectric constant. In a case of the air conditioner, the refrigerant is in contact with the winding of the electric motor 5 and is also in contact with a case of the compressor 200, and therefore there is a problem that the floating capacitance of the electric motor 5 is especially large.

In a case where a signal from the inverter control unit 8 is used by using a predetermined method, as described in Patent Literatures 1 and 2 described above, compensation tends to be suppressed because the leak current may be caused to increase by inverse compensation. Therefore, in order to suppress inverse compensation, it is effective to detect the leak current and execute control in such a manner that the detected leak current becomes 0, as described in Patent Literature 4 described above. Meanwhile, in the method described in Patent Literature 4 in which a compensation current is injected to a ground after detection, a response delay occurs and therefore compensation synchronized with the detected leak current cannot be performed. In general, the methods described in Patent Literatures 1 and 2 are classified into an open-loop type, and the method described in Patent Literature 4 is classified into a feedback type.

In the present embodiment, in the power conversion device 110 executing the feedback type control, the leak current leaking from the floating capacitance to the ground is reduced, and inverse compensation is prevented. The power conversion device 110 includes: a leak-current detecting unit 21 detecting the leak current that is a zero-phase current; a leak-current control unit 22 that executes control to reduce the leak current while performing lead compensation for a response delay from detection of the leak current to output of an anti-phase current, on the basis of the leak current detected by the leak-current detecting unit 21; and an anti-phase current generating unit 23 that generates a current that is in anti-phase with respect to the leak current and injects the current to the ground E2 in order to cancel out the leak current leaking from the electric motor 5 to the ground E2, on the basis of a control signal from the leak-current control unit 22.

Figure 2:
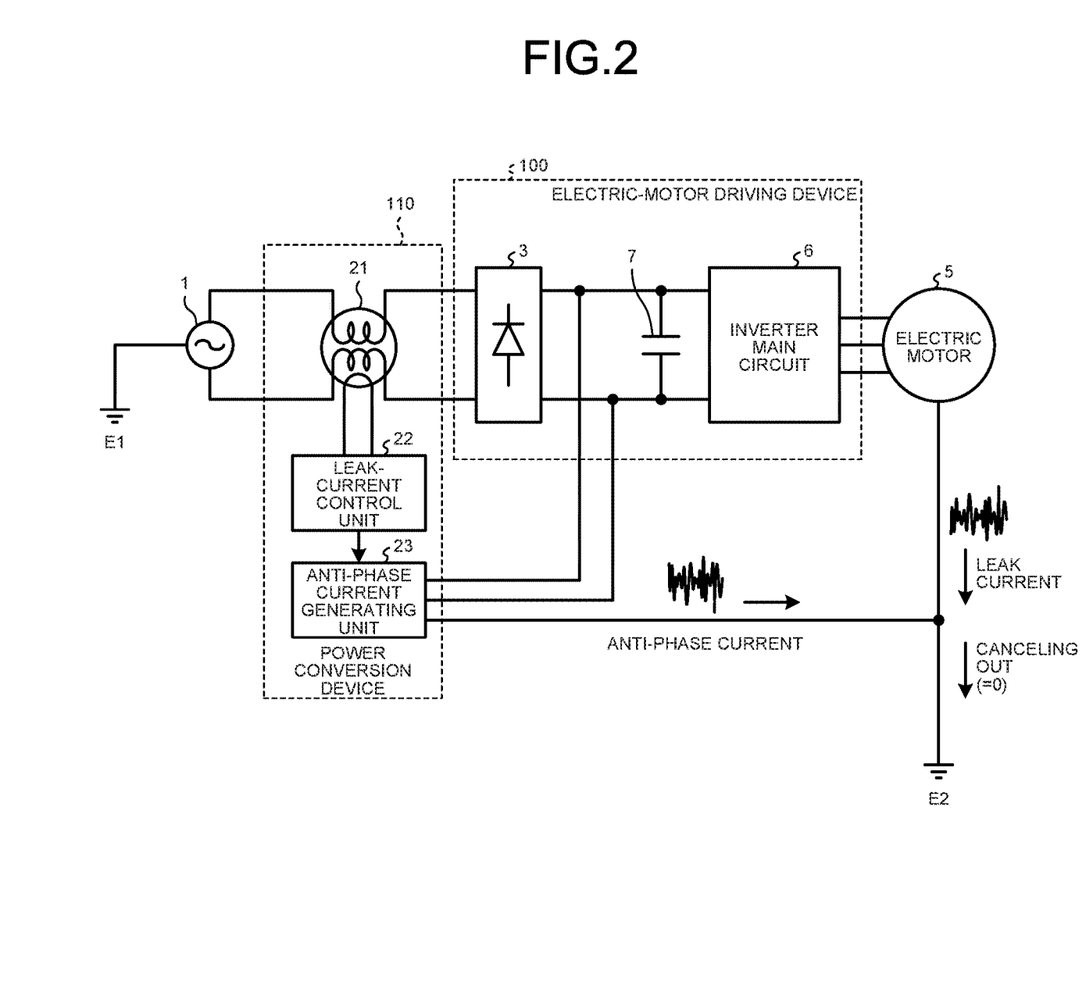
FIG. 2 is a diagram illustrating image waveforms, which represent a principle of a compensation operation that cancels out a leak current.

FIG. 2 is a diagram illustrating image waveforms, which represent a principle of a compensation operation that cancels out a leak current. In FIG. 2, a simplified configuration as compared with that in FIG. 1 is illustrated. The anti-phase current generating unit 23 of the power conversion device 110 outputs an anti-phase current that is in anti-phase with respect to a leak current leaking from the electric motor 5. The leak current leaking from the electric motor 5 circulates to the electric-motor driving device 100 from the alternating-current power supply 1 via the ground E2 and the ground E1. Therefore, the leak-current detecting unit 21 can detect the leak current leaking from the electric motor 5 by detecting a current output from the alternating-current power supply 1. Also, the leak-current detecting unit 21 can also detect a leak current leaking from the electric-motor driving device 100, although not illustrated, by detecting the current output from the alternating-current power supply 1. Further, when the leak current detected by the leak-current detecting unit 21 becomes 0 (zero), it means that not only the current leaking from the electric motor 5 but also all leak currents leaking from other portions, for example, the leak current leaking from the electric-motor driving device 100, are suppressed.

It is ideal that the anti-phase current can be instantaneously output without any response time delay so as to cancel out the leak current detected by the leak-current detecting unit 21. However, such output is not possible in practice. When a phase is shifted by an amount corresponding to a response time, the shift amount may become an inverse compensation amount. Therefore, in the power conversion device 110 of the present embodiment, the delay is suppressed by using a storage unit and executing repetitive control. The repetitive control is a method that stores data of a change having a certain cyclicity for the entire cycle, and executes control on the basis of the stored data under assumption that the change having the cyclicity repeatedly occurs.

Figure 3:
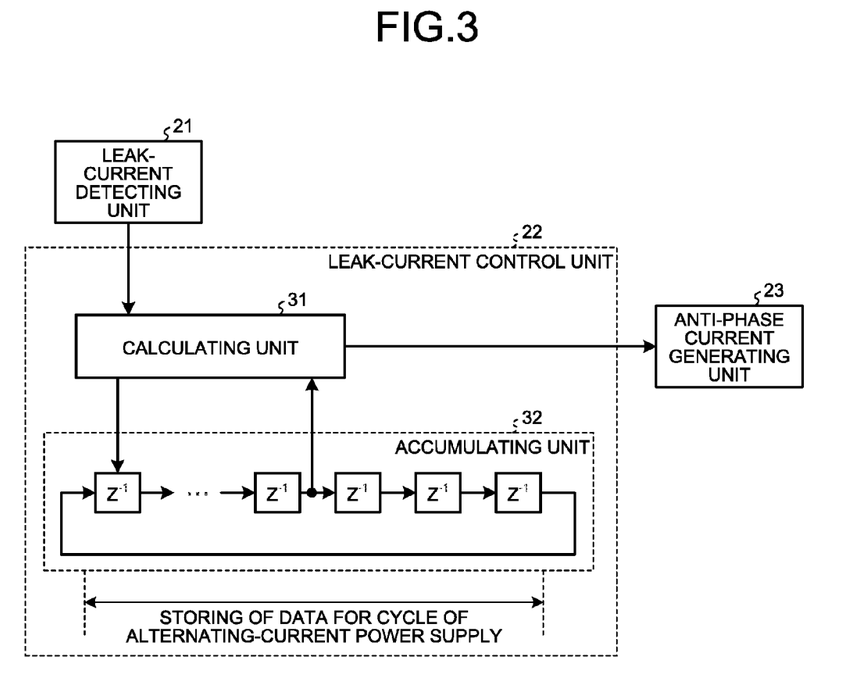
FIG. 3 is a circuit block diagram illustrating a configuration example of a leak-current control unit according to the first embodiment.

FIG. 3 is a circuit block diagram illustrating a configuration example of the leak-current control unit 22 according to the present embodiment. A leak current detected by the leak-current detecting unit 21 is input to the leak-current control unit 22. The leak-current control unit 22 outputs a control signal for canceling out the detected leak current to the anti-phase current generating unit 23. However, when the leak-current control unit 22 uses the leak current detected by the leak-current detecting unit 21 as it is, the output is delayed by a time of calculation in a calculating unit 31 inside the leak-current control unit 22, so that generation of an anti-phase current is delayed.

The leak current is classified into a kind of noise that has a relatively low frequency and, in particular, has cyclicity of a frequency of the alternating-current power supply 1. Therefore, the leak-current control unit 22 is provided with an accumulating unit 32 that is a storage unit for storing leak-current data of one cycle of an output frequency of the alternating-current power supply 1. The accumulating unit 32 can be configured in a form of a shift register that can store the leak-current data of one cycle of the alternating-current power supply 1, for example. However, the configuration thereof is not limited thereto. Another configuration can be employed. The leak-current control unit 22 accumulates the leak-current data detected by the leak-current detecting unit 21 and input thereto, in the accumulating unit 32 via the calculating unit 31.

For the anti-phase current generating unit 23, the calculating unit 31 calculates a control signal having cyclicity which is synchronized with the alternating-current power supply 1 in such a manner that an anti-phase current with respect to the leak current is output and the leak current is canceled out. The calculation of the calculating unit 31 is based on the leak-current data accumulated in the accumulating unit 32, the data of which is date obtained by one of several samples before reaching one cycle of samples, for example, one of three samples before reaching one cycle of samples as illustrated in FIG. 3. The leak-current data accumulated in the accumulating unit 32, the data of which is obtained by one of three samples before reaching one cycle of samples, indicates data in an advanced state by three samples from the present in a case where a leak-current data before one cycle of the alternating-current power supply 1 is compared with a present state of the leak current.

The leak-current data used for generation of the anti-phase current is data one cycle of the alternating-current power supply 1 before the present. However, by using the fact that the leak current has cyclicity of the same cycle as the alternating-current power supply 1, the power conversion device 110 can achieve lead compensation by using the accumulating unit 32. Although the leak-current data that is cyclic data is accumulated in the accumulating unit 32, the data is not limited to data of one cycle but can be data of two cycles or three cycles. As the number of cycles to be accumulated increases, a data capacity required for accumulation increases in accordance with the increase of the number of the cycles. However, for example, by averaging the cyclic data with data of a plurality of cycles, an influence of a sudden noise can be avoided. It suffices that the accumulating unit 32 accumulates data of an effective number of cycles, considering a relation with an effect of lead compensation.

Although the leak-current data three samples before the present is used for calculation in FIG. 3, this is only an example. The data can be set to correspond to a time delay caused by calculation by the calculating unit 31, and the same effect can be also obtained even when the leak-current data three samples before the present is not used. Further, a case has been described in which the leak-current data detected by the leak-current detecting unit 21 is accumulated in the accumulating unit 32, but what is accumulated is not limited thereto. For example, the accumulating unit 32 can accumulate an instruction value of the anti-phase current, and it is needless to mention that the same effect can be obtained even when data in a process of generation of the anti-phase current is accumulated.

Figure 4:
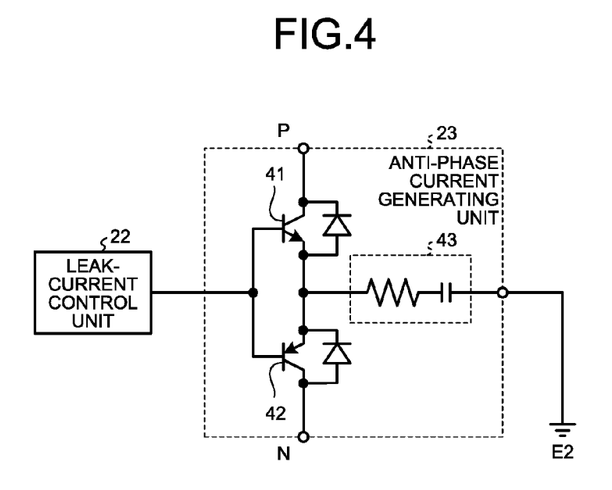
FIG. 4 is a circuit block diagram illustrating a configuration example of an anti-phase current generating unit according to the first embodiment.

FIG. 4 is a circuit block diagram illustrating a configuration example of the anti-phase current generating unit 23 according to the present embodiment. Assuming that voltages on both sides of the smoothing capacitor 7 are points P and N as illustrated in FIG. 1, points coupled to those points P and N are illustrated in FIG. 4. Electric power owing to the voltages on the both sides of the smoothing capacitor 7 is supplied to the anti-phase current generating unit 23. The anti-phase current generating unit 23 generates an anti-phase current with respect to a leak current on the basis of a control signal from the leak-current control unit 22 and injects the anti-phase current to the ground E2 that is an earth point. Although a configuration is illustrated in FIG. 4 in which injection is performed via an impedance 43 of a serial circuit formed by a resistor and a capacitor, a configuration for injection can be formed by the capacitor only or can include an inductive element such as an inductance. The circuit configuration is not limited, as long as it is an impedance that can simulate the electric motor 5.

Further, in FIG. 4, a circuit is configured by totem-pole transistors 41 and 42. However, a configuration of a PNP type and an NPN type, which are turned upside down, can be employed. Furthermore, even when the transistors 41 and 42 are replaced with other elements, a configuration that can inject the anti-phase current has an equivalent effect.

As described above, according to the present embodiment, the power conversion device 110 is configured as follows. The leak-current detecting unit 21 detects a leak current. In the leak-current control unit 22, data of the leak current that is a zero-phase current detected by the leak-current detecting unit 21 is accumulated in the accumulating unit 32. The calculating unit 31 generates a control signal for generating an anti-phase current canceling out the leak current by using data, the date of which is accumulated in the accumulating unit 32 and obtained by one of several samples before reaching one cycle of samples on the basis of a calculation time. The anti-phase current generating unit 23 generates the anti-phase current on the basis of the control signal from the leak-current control unit 22 and outputs the anti-phase current to an earth point. Owing to this configuration, the power conversion device 110 can perform lead compensation for the detected leak current. Therefore, in a case of compensating the leak current, it is possible to eliminate a delay of a compensation operation and reduce the leak current without causing any inverse compensation.

Second Embodiment

Configurations of the leak-current control unit 22 and the anti-phase current generating unit 23 are not limited to those illustrated in FIGS. 3 and 4, but can be of a three-phase configuration.

Figure 5:
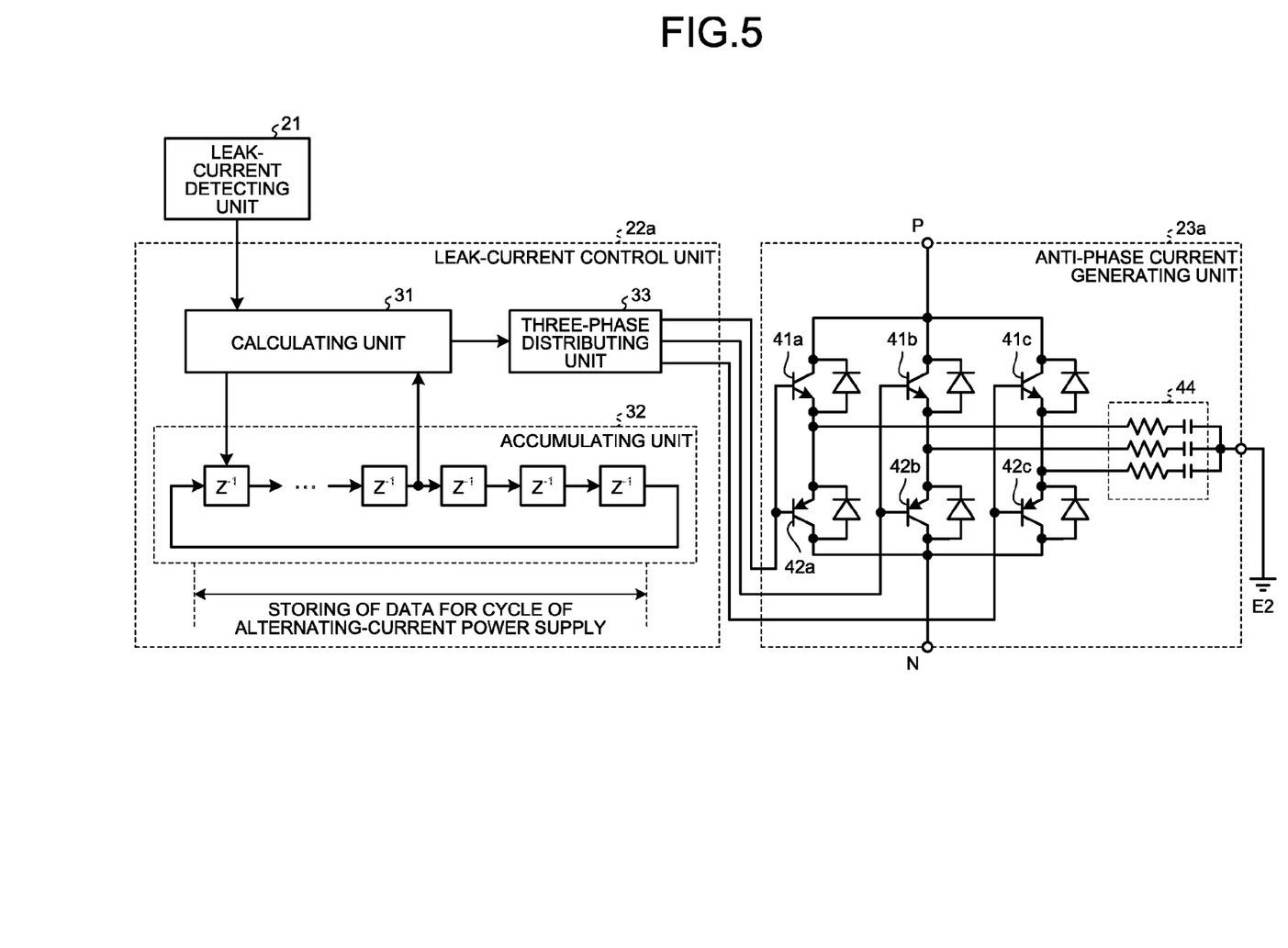
FIG. 5 is a circuit block diagram illustrating a configuration example of a leak-current control unit and an anti-phase current generating unit according to a second embodiment.

FIG. 5 is a circuit block diagram illustrating a configuration example of a leak-current control unit and an anti-phase current generating unit according to a second embodiment. A difference from FIGS. 3 and 4 is in that a three-phase configuration is employed. A leak-current control unit 22a is provided with a three-phase distributing unit 33 in such a manner that each control signal has a phase difference of 120 degrees with respect to others. An anti-phase current generating unit 23a also has a three-phase configuration, and is provided with transistors 41a, 41b, 41c, 42a, 42b, and 42c for respective phases and is further provided with an impedance 44 that has a serial circuit configured by a resistor and a capacitor for each phase. The transistor 41a and the transistor 42a correspond to one phase, the transistor 41b and the transistor 42b correspond to another one phase, and the transistor 41c and the transistor 42c correspond to still another one phase. As the electric motor 5, generally, a three-phase electric motor is commonly used. The reason why the three-phase electric motor is commonly used is that the three-phase electric motor has a higher efficiency as compared with a single-phase electric motor or the like.

By applying the three-phase configuration to the impedance 44, it is possible to obtain effects that the electric motor 5 can be accurately simulated and injection of an anti-phase current with respect to a leak current can be more precisely performed in the anti-phase current generating unit 23a.

Third Embodiment

Figure 6:
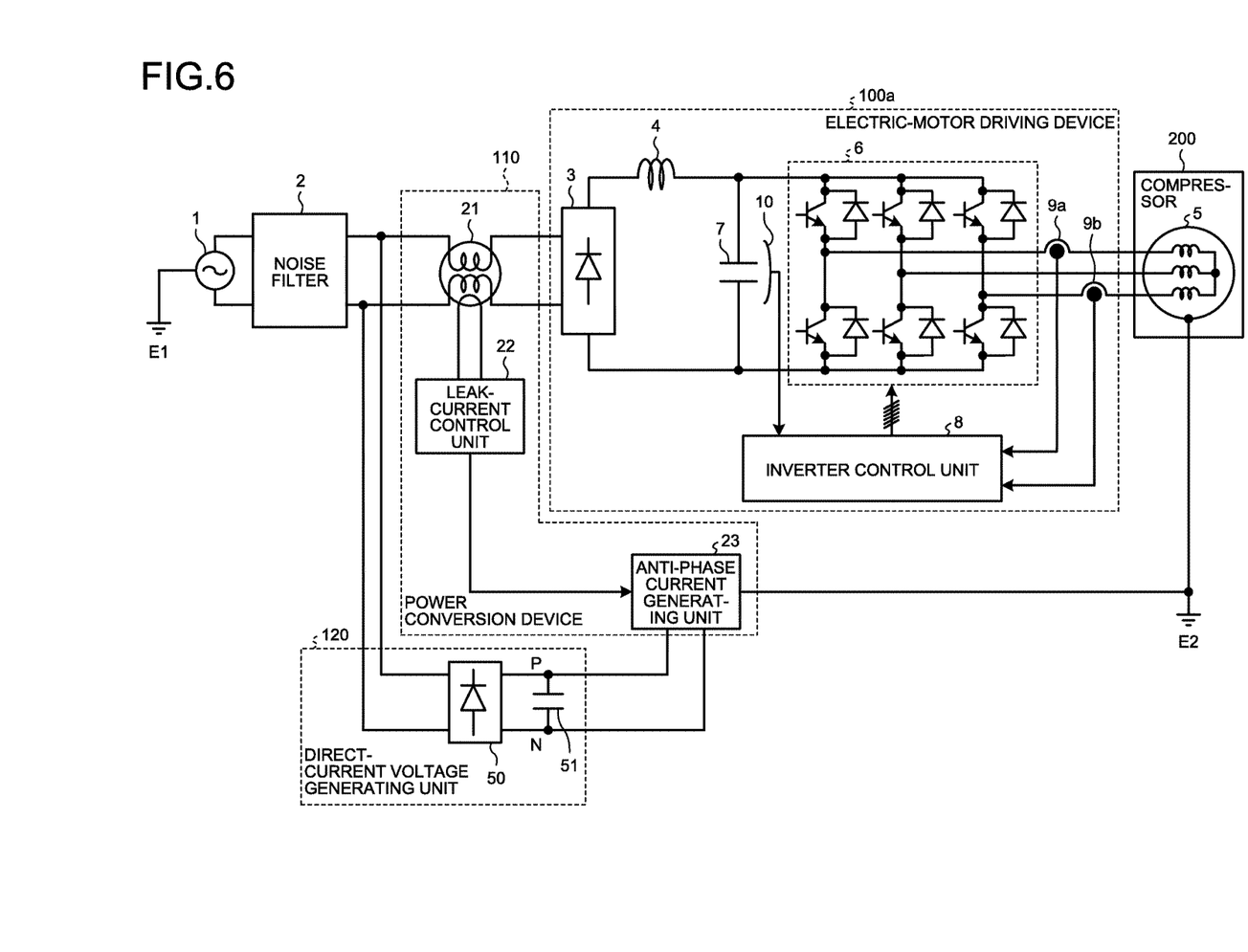
FIG. 6 is a circuit block diagram illustrating a configuration example of a power conversion device and an electric-motor driving device according to a third embodiment.

FIG. 6 is a circuit block diagram illustrating a configuration example of a power conversion device and an electric-motor driving device according to a third embodiment. In the electric-motor driving device 100 of the first embodiment illustrated in FIG. 1, electric power is supplied to the anti-phase current generating unit 23 from voltages on both sides of the smoothing capacitor 7. In the present embodiment, a configuration is employed in which electric power is supplied to the anti-phase current generating unit 23 from a side of the rectifier 3 close to the alternating-current power supply 1, not from an electric-motor driving device 100a. A voltage on the side of the rectifier 3 close to the alternating-current power supply 1 is an alternating-current voltage. Therefore, a direct-current voltage generating unit 120 is provided, which includes a rectifier 50 different from the rectifier 3 and a smoothing capacitor 51, and generates a direct-current voltage and supplies it to the anti-phase current generating unit 23. The direct-current voltage generating unit 120 is coupled to the power conversion device 110.

Also, in FIG. 6, the electric power is supplied from a side of the leak-current detecting unit 21 close to the alternating-current power supply 1. This arrangement aims to accurately detect a component leaking in the inverter main circuit 6. Further, not a little leak also occurs in the anti-phase current generating unit 23. Therefore, a configuration can be employed in which the electric power is supplied to the anti-phase current generating unit 23 from a point between the leak-current detecting unit 21 and the rectifier 3, although not illustrated. In this case, the power conversion device 110 performs an operation that injects an anti-phase leak current so as to also suppress the leak current in the anti-phase current generating unit 23.

Fourth Embodiment

Figure 7:
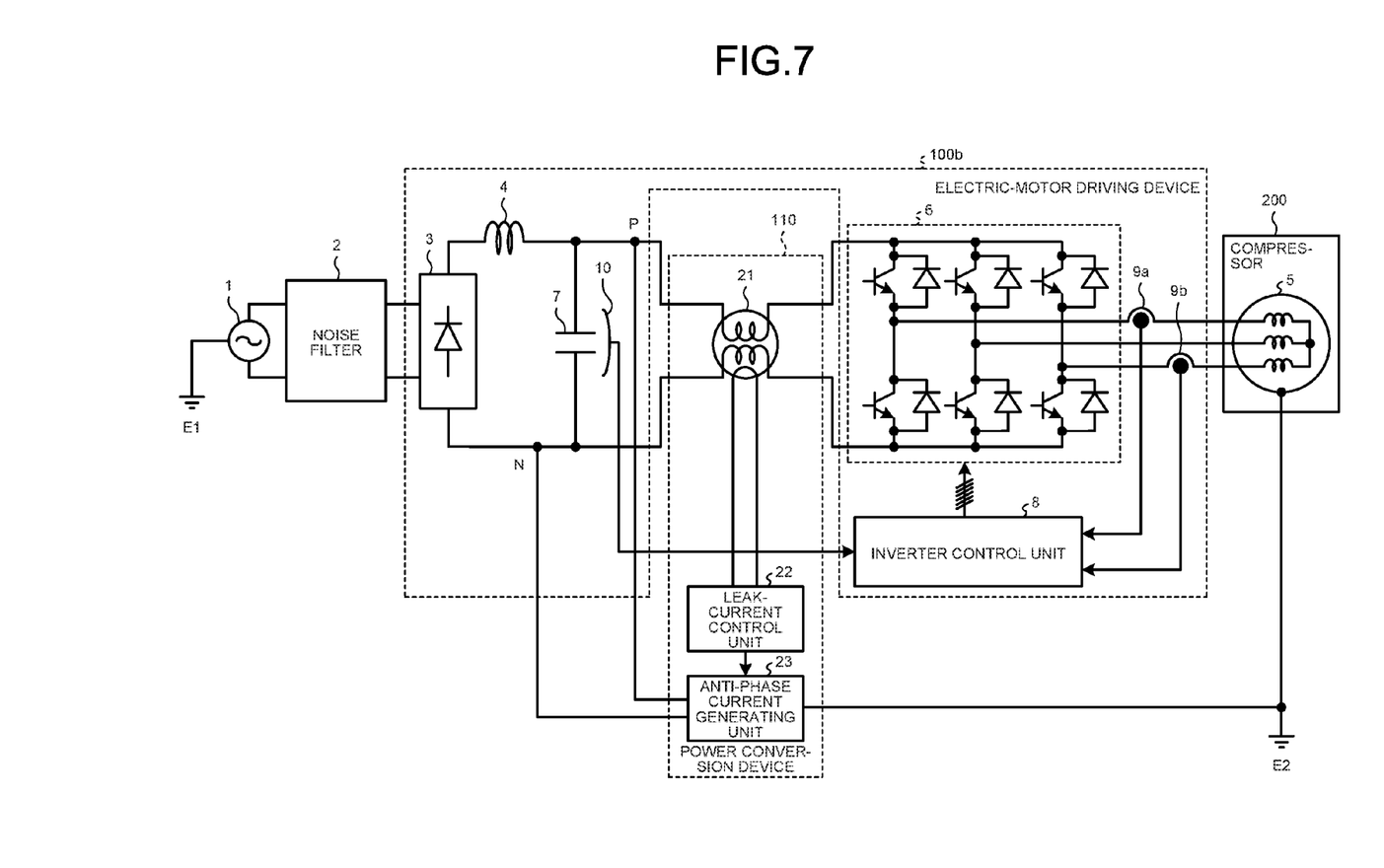
FIG. 7 is a circuit block diagram illustrating a configuration example of a power conversion device and an electric-motor driving device according to a fourth embodiment.

FIG. 7 is a circuit block diagram illustrating a configuration example of a power conversion device and an electric-motor driving device according to a fourth embodiment. As illustrated in FIG. 7, the leak-current detecting unit 21 can be arranged on a direct-current side of an electric-motor driving device 100b. At this time, in a case where the leak-current detecting unit 21 is configured by a common mode coil, a malfunction may be caused by direct-current exciting. Therefore, the coil is designed to deal with the malfunction.

Fifth Embodiment

Figure 8:
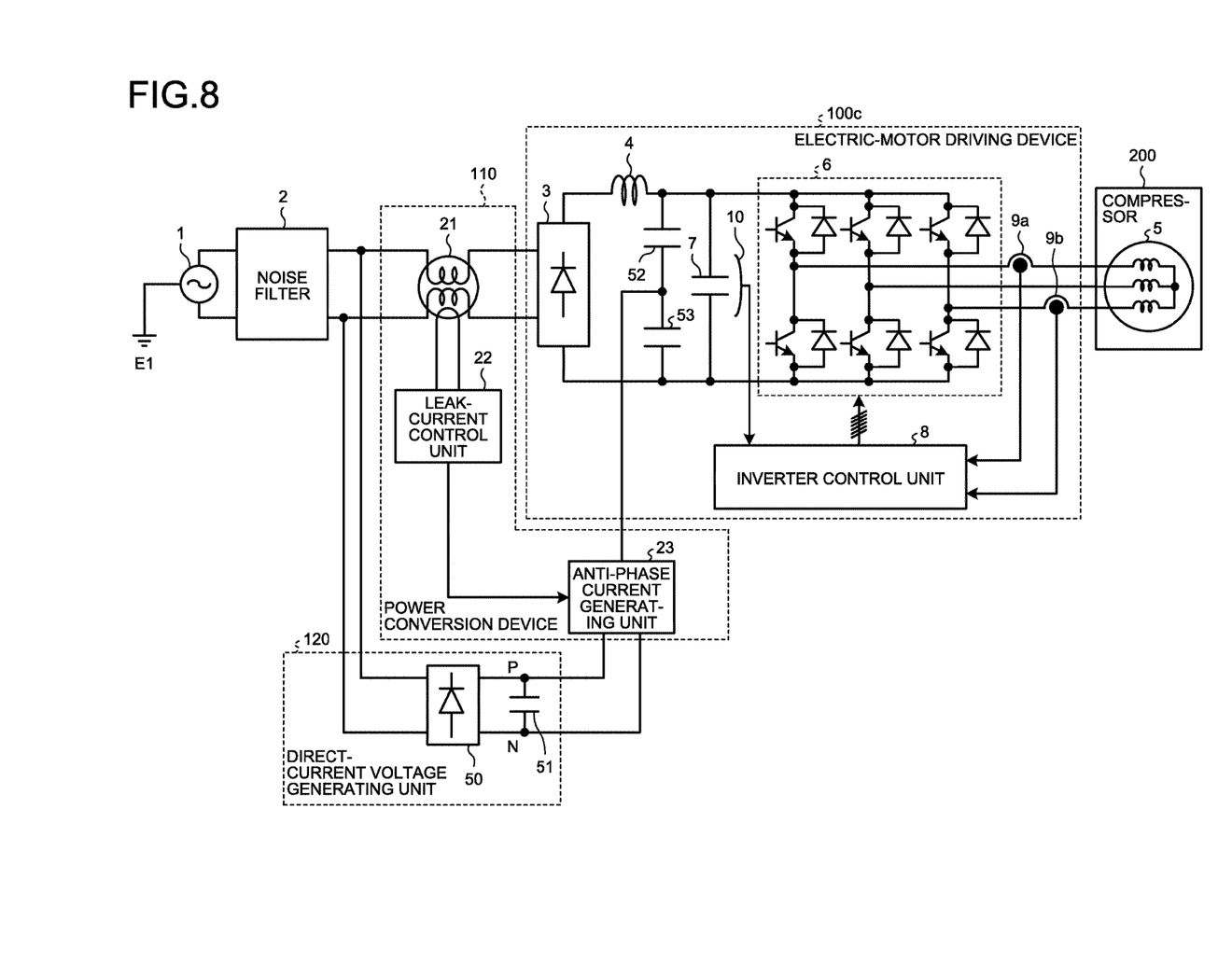
FIG. 8 is a circuit block diagram illustrating a configuration example of a power conversion device and an electric-motor driving device according to a fifth embodiment.

FIG. 8 is a circuit block diagram illustrating a configuration example of a power conversion device and an electric-motor driving device according to a fifth embodiment. To the electric-motor driving device 100 illustrated in FIG. 1, smoothing capacitors 52 and 53 are further added. As illustrated in FIG. 8, in the power conversion device 110, it is also possible to inject an anti-phase current that is in anti-phase with respect to a leak current to a point of a half of a direct-current voltage provided by the smoothing capacitors 52 and 53 of an electric-motor driving device 100c, that is, a ½-potential point, not to the ground E2 of the electric motor 5. This means that ½ of the direct-current voltage has equivalently the same meaning as a potential change at the ground E2, and the leak current that corresponds to the potential change of ½ of this direct-current voltage flows. Therefore, in the power conversion device 110, changing the potential of ½ of the direct-current voltage of the electric-motor driving device 100c so as to suppress the leak current is equivalent to injection of the anti-phase current. In this case, the power conversion device 110 is configured to supply electric power to the anti-phase current generating unit 23 from an alternating-current side.

Further, it is needless to mention that, although not illustrated, a configuration, in which the leak-current detecting unit 21 and a current injection point of the anti-phase current generating unit 23 on the alternating-current side are switched so that the leak current is detected on a direct-current side and the anti-phase current is injected to a ½ potential point on the alternating-current side, is equivalently the same.

In the embodiments described above, respective components of the power conversion device 110 are arranged on a downstream side of the noise filter 2. This is because the noise filter 2 is originally intended to be specialized in an operation of removing a noise component such as a leak current from the alternating-current power supply 1. When a configuration is employed in which a leak current leaking from the electric-motor driving device circulates only between the electric-motor driving device and the power conversion device 110, a flow to the ground E2 is eliminated, so that an influence of the flow on a human body is also eliminated.

Sixth Embodiment

Figure 9:
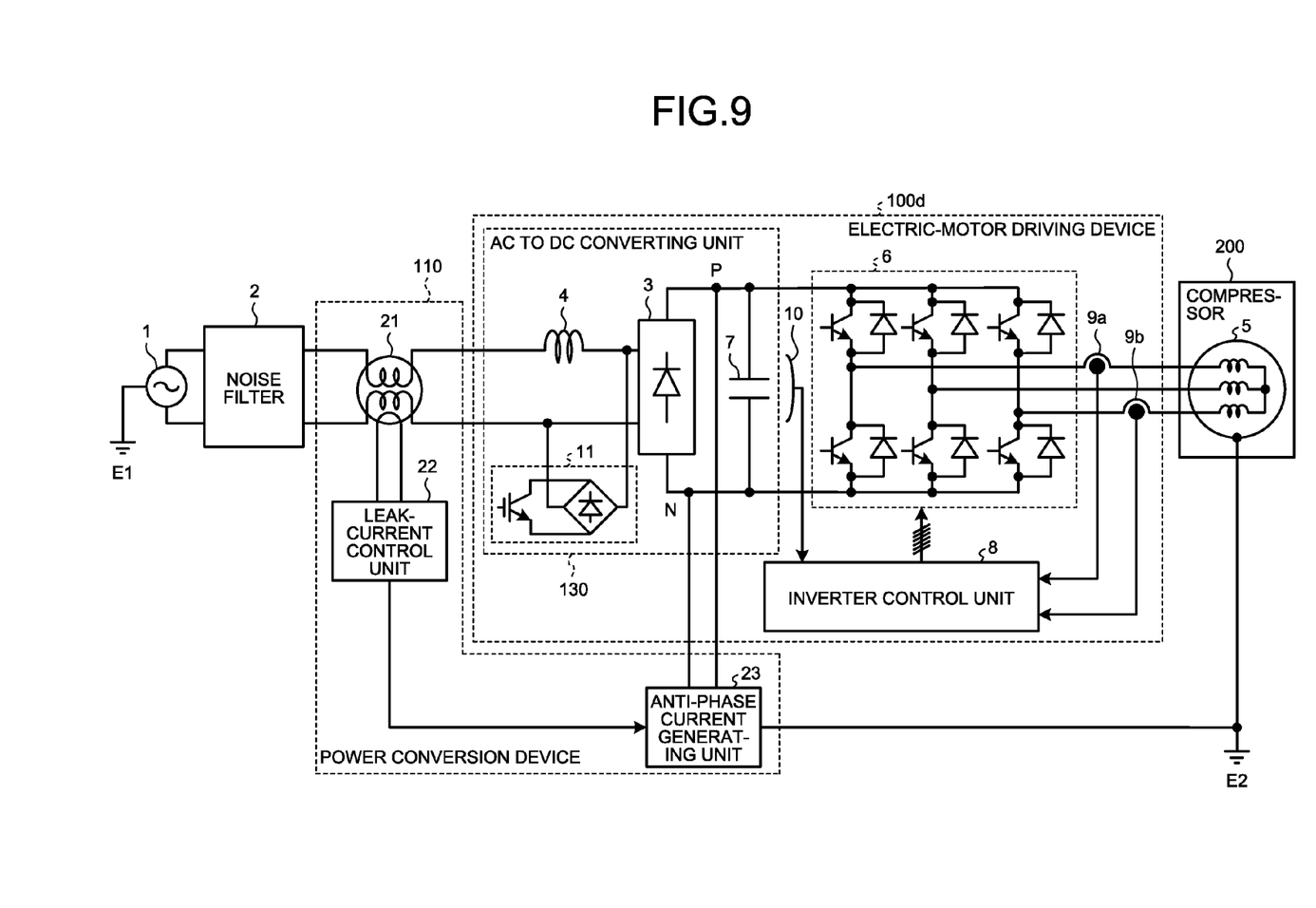
FIG. 9 is a circuit block diagram illustrating a configuration example of a power conversion device and an electric-motor driving device according to a sixth embodiment.

FIG. 9 is a circuit block diagram illustrating a configuration example of a power conversion device and an electric-motor driving device according to a sixth embodiment. In the electric-motor driving devices in the embodiments described above, all AC to DC converting units are described in a conversion method called full-wave rectification. However, even when an active type AC to DC converting unit 130 that performs switching is used like an electric-motor driving device 100d illustrated in FIG. 9, an operation of the power conversion device 110 is not specifically changed, and it is needless to mention that the same effect can be obtained.

The AC to DC converting unit 130 illustrated in FIG. 9 is configured to include a bi-directional switching circuit 11 having a switching element on its alternating-current side, as well as the rectifier 3, the reactor 4, and the smoothing capacitor 7. However, even when AC to DC converting units illustrated in FIGS. 10 and 11 are used, an equivalent effect can be obtained.

Figure 10:
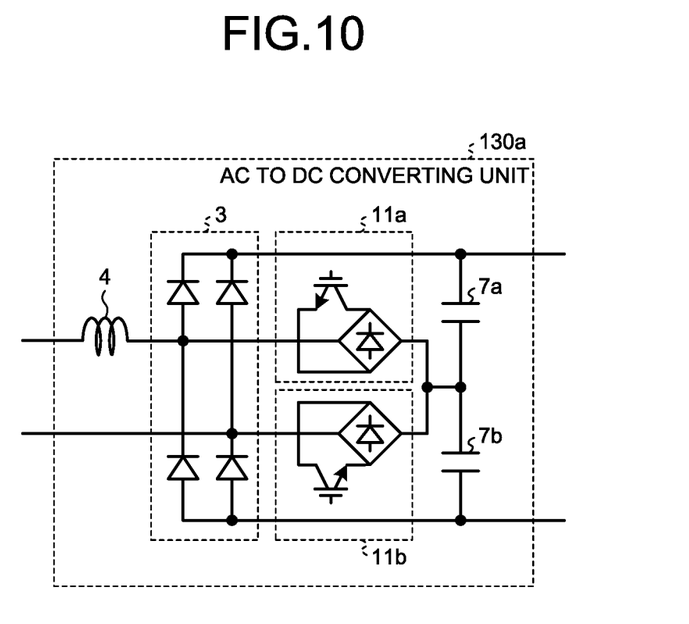
FIG. 10 is a circuit block diagram illustrating a configuration example of an AC to DC converting unit according to the sixth embodiment.
Figure 11:
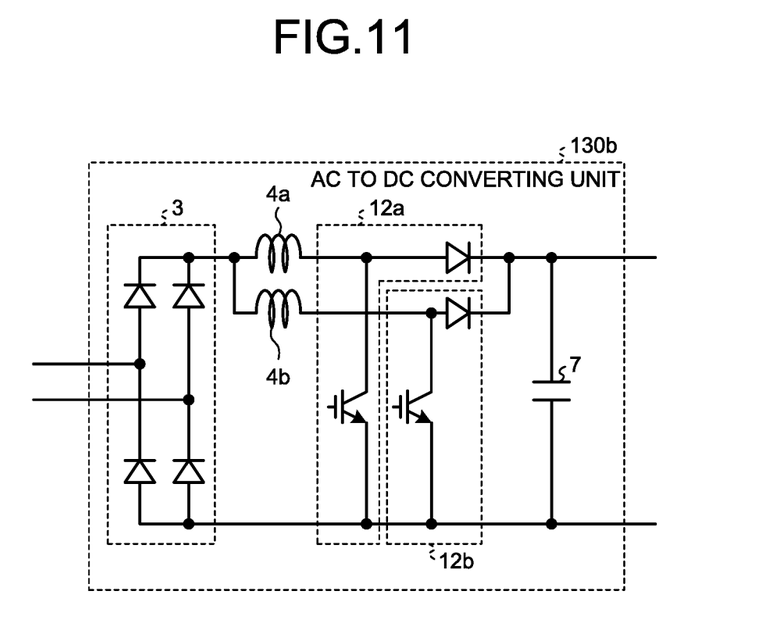
FIG. 11 is a circuit block diagram illustrating a configuration example of the AC to DC converting unit according to the sixth embodiment.

FIGS. 10 and 11 are circuit block diagrams respectively illustrating a configuration example of an AC to DC converting unit according to the present embodiment. An AC to DC converting unit 130a illustrated in FIG. 10 includes the rectifier 3, the reactor 4, smoothing capacitors 7a and 7b, and bi-directional switching circuits 11a and 11b. An AC to DC converting unit 130b illustrated in FIG. 11 includes the rectifier 3, reactors 4a and 4b, the smoothing capacitor 7, and uni-directional switching circuits 12a and 12b. The AC to DC converting unit 130a illustrated in FIG. 10 and the AC to DC converting unit 130b illustrated in FIG. 11 can boost a direct-current voltage equal to or higher than a peak voltage value of the alternating-current power supply 1. In the electric-motor driving device 100d, as a voltage output to the electric motor 5 is higher, a leak current from the electric motor 5 increases. Therefore, a combination of the electric-motor driving device including either of these AC to DC converting units and the power conversion device 110 is excellent, and it can be said that an effect is enhanced when the power conversion device 110 executes control that reduces the leak current.

The leak-current detecting unit 21 is described as a common mode coil. However, the leak-current detecting unit 21 is not limited to the common mode coil, as long as it can detect the leak current. For example, unbalance of a current can be detected by a CT (Current Transformer) that detects the current, or a zero-phase voltage can be detected by a voltage detector. Alternatively, a configuration can be employed in which an insulated voltage or an insulated current is detected by providing a transformer.

In the power conversion device 110, the leak current increased by the boosting can be reduced. Therefore, it is possible to use a highly efficient high-voltage electric motor in the electric-motor driving device 100d, contributing to improvement of the efficiency of an apparatus as a whole.

Seventh Embodiment

Figure 12:
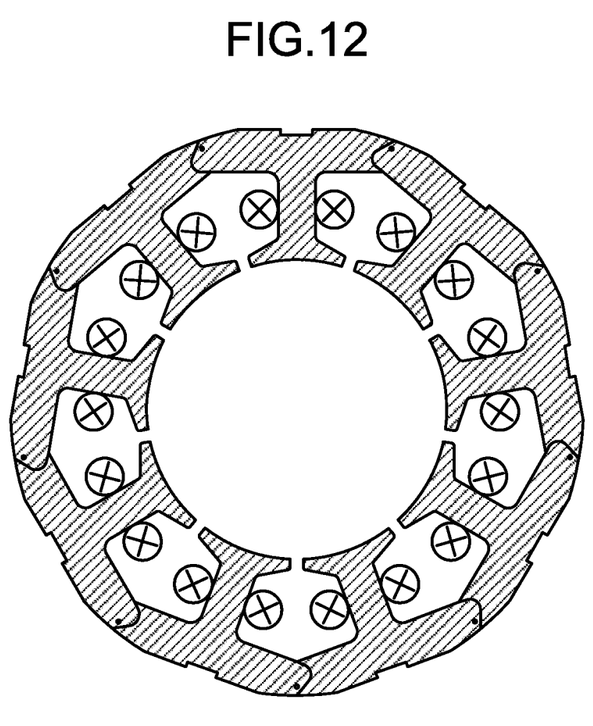
FIG. 12 is a cross-sectional view illustrating an example of a stator of an electric motor according to a seventh embodiment.

FIG. 12 is a cross-sectional view illustrating an example of a stator of the electric motor 5 according to a seventh embodiment. A hatched portion represents the stator, and a ○ (circle) portion including x (cross) therein represents a winding. Further, a thin insulation material is arranged between the stator and the winding, although not illustrated in FIG. 12. With progress of energy saving in the electric motor 5, an insulation distance between the winding arranged on the stator and the stator becomes short. As the insulation distance becomes shorter, a floating capacitance becomes larger, so that a leak current can flow more easily. For insulating the winding and the stator from each other, the insulation material is formed of plastic resin conventionally. However, in order to improve the efficiency of the electric motor 5, a very thin film-like insulation material, for example, a material having a thickness of less than 1 mm is employed, which causes further increase of the leak current.

The leak current caused to increase by provision of the film-like insulation material in the electric motor 5 that is a concentrated winding type illustrated in FIG. 12 is reduced by the power conversion device 110, so that it is possible to improve the efficiency in the electric-motor driving device 100. Further, even in a case where an AC to DC converting unit capable of boosting a voltage cannot be conventionally used because of the leak current, or is operated with its boosting performance suppressed and therefore loss is increased, as described before, it is possible to use the AC to DC converting unit capable of boosting the voltage by providing the power conversion device 110, contributing to improvement of the efficiency in an apparatus as a whole.

Because a driving operation of the electric motor 5 is caused by the inverter main circuit 6, a range of the driving operation is changed depending on a direct-current voltage input to the inverter main circuit 6. In particular, in a case of the electric motor 5 using a permanent magnet as a rotor, a magnetic flux of the magnet is caused to interlink with a coil on a stator side by rotation of the permanent magnet, so that an induced voltage is generated.

A current flowing in the electric motor 5 can be controlled by a potential difference between the induced voltage of the electric motor 5 and a voltage output from the inverter main circuit 6, and the electric motor 5 can output a torque in proportion to the current. The output torque is in proportion to a value obtained by multiplying the current by the number of stator coil windings. Therefore, when the number of the windings is increased, it is possible to output a torque equal to a torque obtained when the number of the windings is not changed but the current is increased, from the electric motor 5 without increasing the current. To the contrary, when the current is increased, copper loss in the electric motor 5 and conduction loss in the inverter main circuit 6 increase, so that loss in the electric-motor driving device 100 increases.

Therefore, the power conversion device 110 is used together with the electric-motor driving device 100 using the inverter main circuit 6 that drives the electric motor 5 using a permanent magnet. Further, by using either of the AC to DC converting units 130a and 130b capable of boosting a direct-current voltage illustrated in FIGS. 10 and 11, it is possible to supply a high voltage that is boosted.

Accordingly, when an electric-motor driving device is configured to include the AC to DC converting unit 130a or 130b capable of supplying a high voltage, by increasing the number of windings to raise a voltage, it is possible to output a torque equal to that obtained when the number of windings is not changed but a current is increased, without increasing the current.

Owing to this configuration, in the electric-motor driving device driving the electric motor 5 having a raised high voltage, it is possible to increase its efficiency. A leak current increased by the configuration for increasing the efficiency can be reduced to a level equal to or less than that of an electric-motor driving device including the electric motor 5 having an original number of windings, because the power conversion device 110 configured in parallel suppresses the leak current.

As described above, it is possible to reduce a leak current by the power conversion device 110 even when a floating capacitance with respect to the ground E2 is increased by the electric motor 5 configured to save energy. Therefore, the efficiency of an electric-motor driving device can be improved.

Eighth Embodiment

In the embodiments described above, by configuring the power conversion device 110 by a MOSFET (Metal Oxide Semiconductor Field Effect Transistor) called a super-junction structure MOSFET, it is possible to achieve further reduction of loss and to provide the power conversion device 110 with a high efficiency. The super-junction structure is a structure having a P-layer that is deeper than that in a usual MOSFET. It is known that the super-junction structure has higher voltage strength although it has a low on-state resistance, because the deeper P-layer is in contact with an N-layer in a wide portion.

Also, it is needless to mention that, even when a switching element or a diode configuring a circuit of the power conversion device 110 is formed by a wide band-gap semiconductor, such as GaN (gallium nitride), SiC (silicon carbide), or diamond, it is possible to provide the power conversion device 110 with further reduced loss. Further, by using the wide band-gap semiconductor, voltage resistance can be increased and an allowable current density can be also increased. Therefore, downsizing of the MOSFET can be achieved, so that downsizing of a semiconductor module incorporating these elements therein can be also achieved. Because of a high heat-resisting property, it is also possible to downsize a radiation fin of a heat sink. In the power conversion device 110, instead of applying the wide band-gap semiconductor to all the switching elements or diodes, the wide band-gap semiconductor can be applied to at least one of components.

Further, by using the wide band-gap semiconductor, the power conversion device 110 reducing the leak current can reduce the leak current by an operation at a higher frequency in order to reduce the leak current having a wide bandwidth. Although the high-frequency operation increases loss and leads to further increase of the leak current, it can be said that application of the wide band-gap semiconductor to the power conversion device 110 is suitable because the wide band-gap semiconductor has excellent high-frequency operation characteristics. By applying the wide band-gap semiconductor, it is possible to widen a bandwidth in which the leak current is reduced in the power conversion device 110, so that the leak current can be further reduced. Also, it is possible to configure the power conversion device 110 without increasing loss even in a high-frequency operation and without degrading the energy saving performance of the electric-motor driving device 100 with its efficiency increased by the electric motor 5 having the increased number of windings.

In addition, the alternating-current power supply 1 is described as a single-phase power supply. However, it is not limited to the single-phase power supply. It is needless to mention that, even when the alternating-current power supply 1 is a three-phase power supply, an equivalent effect can be obtained.

As examples of use of the power conversion device described above, the power conversion device described above can be applied to the whole consumer electronics, for example, an air conditioner, a freezer, a refrigerator, a dehumidifier, a showcase, a heat-pump type washer-dryer, and a heat-pump type water heater, because the power conversion device described above can achieve energy saving by being used together with an electric-motor driving device that drives a permanent-magnet electric motor, and can largely reduce a leak current from a compressor mounted therein an electric motor having a large floating capacity because of a refrigerant. Further, the power conversion device described above can be also applied to a vacuum cleaner, a fan motor, a ventilating fan, a hand dryer, an induction heating electromagnetic cooker, and the like.

REFERENCE SIGNS LIST 1 alternating-current power supply
2 noise filter
3, 50 rectifier
4, 4a, 4b reactor
5 electric motor
6 inverter main circuit
7, 7a, 7b, 51, 52, 53 smoothing capacitor
8 inverter control unit
9a, 9b current detector
10 voltage detector
11, 11a, 11b bi-directional switching circuit
12a, 12b uni-directional switching circuit
21 leak-current detecting unit
22, 22a leak-current control unit
23, 23a anti-phase current generating unit
31 calculating unit
32 accumulating unit
33 three-phase distributing unit
41, 41a, 41b, 41c, 42, 42a, 42b, 42c transistor
43, 44 impedance
100, 100a, 100b, 100c, 100d electric-motor driving device
110 power conversion device
120 direct-current voltage generating unit
130, 130a, 130b AC to DC converting unit
200 compressor

The invention claimed is:
1. A power conversion device comprising:
a leak-current detecting unit that detects a zero-phase current flowing from either an electric-motor driving device, which drives an electric motor with electric power from an alternating-current power supply, or the electric motor to a ground;

a leak-current control unit that inputs the zero-phase current detected by the leak-current detecting unit, and generates a control signal having cyclicity that is synchronized with the alternating-current power supply; and an anti-phase current generating unit that inputs the control signal, generates an anti-phase current that is in anti-phase with respect to the zero-phase current, and outputs the anti-phase current, wherein the leak-current control unit includes an accumulating unit accumulating data detected by the leak-current detecting unit, and the leak-current control unit outputs the zero-phase current detected by the leak-current detecting unit as a data to the accumulating unit and outputs the control signal based on a past data accumulated in the accumulating unit to the anti-phase current generating unit, and wherein the accumulating unit is configured in a form of a shift register adapted for storing leak-current data of at least one cycle of the alternating-current power supply.

2. A power conversion device comprising:

a leak-current detecting unit that detects a first zero-phase current flowing from either an electric-motor driving device, which drives an electric motor with electric power from an alternating-current power supply, or the electric motor to a ground, and a second zero-phase current flowing to the ground prior to the first zero-phase current;

a leak-current control unit that inputs the first zero-phase current and the second zero-phase current detected by the leak-current detecting unit, and generates a control signal having cyclicity that is synchronized with the alternating-current power supply; and an anti-phase current generating unit that inputs the control signal, generates an anti-phase current that is in anti-phase with respect to the second zero-phase current and synchronized with the first zero-phase current, and outputs the anti-phase current, wherein the leak-current control unit includes an accumulating unit accumulating data detected by the leak-current detecting unit, and the leak-current control unit outputs the first and second zero-phase currents detected by the leak-current detecting unit as a data to the accumulating unit and outputs the control signal based on a past data accumulated in the accumulating unit to the anti-phase current generating unit, and wherein the accumulating unit is configured in a form of a shift register adapted for storing leak-current data of at least one cycle of the alternating-current power supply.

3. The power conversion device according to claim 2, wherein data of the first zero-phase current and the second zero-phase current that is data detected by the leak-current detecting unit is cyclic data synchronized with the alternating-current power supply.

4. The power conversion device according to claim 1, wherein the power conversion device is coupled to the electric-motor driving device that drives a compressor including the electric motor therein.

5. The power conversion device according to claim 2, wherein the power conversion device is coupled to the electric-motor driving device that drives a compressor including the electric motor therein.

6. The power conversion device according to claim 4, wherein the power conversion device is coupled to the electric-motor driving device driving the electric motor that uses a film-like insulation material for insulating a winding and a stator from each other.

7. The power conversion device according to claim 5, wherein the power conversion device is coupled to the electric-motor driving device driving the electric motor that uses a film-like insulation material for insulating a winding and a stator from each other.

8. The power conversion device according to claim 4, wherein the power conversion device is coupled to the electric-motor driving device provided with an AC to DC converting unit that boosts a direct-current voltage to a peak voltage value of the alternating-current power supply or higher.

9. The power conversion device according to claim 5, wherein the power conversion device is coupled to the electric-motor driving device provided with an AC to DC converting unit that boosts a direct-current voltage to a peak voltage value of the alternating-current power supply or higher.

10. The power conversion device according to claim 1, wherein a wide band-gap semiconductor is used in at least one component of switching devices or diodes configuring a circuit.

11. The power conversion device according to claim 2, wherein a wide band-gap semiconductor is used in at least one component of switching devices or diodes configuring a circuit.

12. A compressor driving device using the power conversion device according to claim 1.

13. A compressor driving device using the power conversion device according to claim 2.

14. The power conversion device according to claim 1, wherein the accumulating unit in the form of the shift register is further adapted for storing leak-current data of a plurality of cycles of the alternating-current power supply, and the leak-current control unit outputs the control signal to anti-phase current generating unit by using data obtained by averaging the leak-current data of the plurality of cycles.

15. The power conversion device according to claim 2, wherein the accumulating unit in the form of the shift register is further adapted for storing leak-current data of a plurality of cycles of the alternating-current power supply, and the leak-current control unit outputs the control signal to anti-phase current generating unit by using data obtained by averaging the leak-current data of the plurality of cycles.

* * * * *